Dec. 16, 1969   H. C. L. NYBERG ET AL   3,484,299
MULTICELL STORAGE BATTERY

Filed Feb. 20, 1967

INVENTORS
HUGO C. L. NYBERG
BERNT H. C. GROBY

BY
Burns, Doane, Benedict, Swecker + Mathis
ATTORNEYS

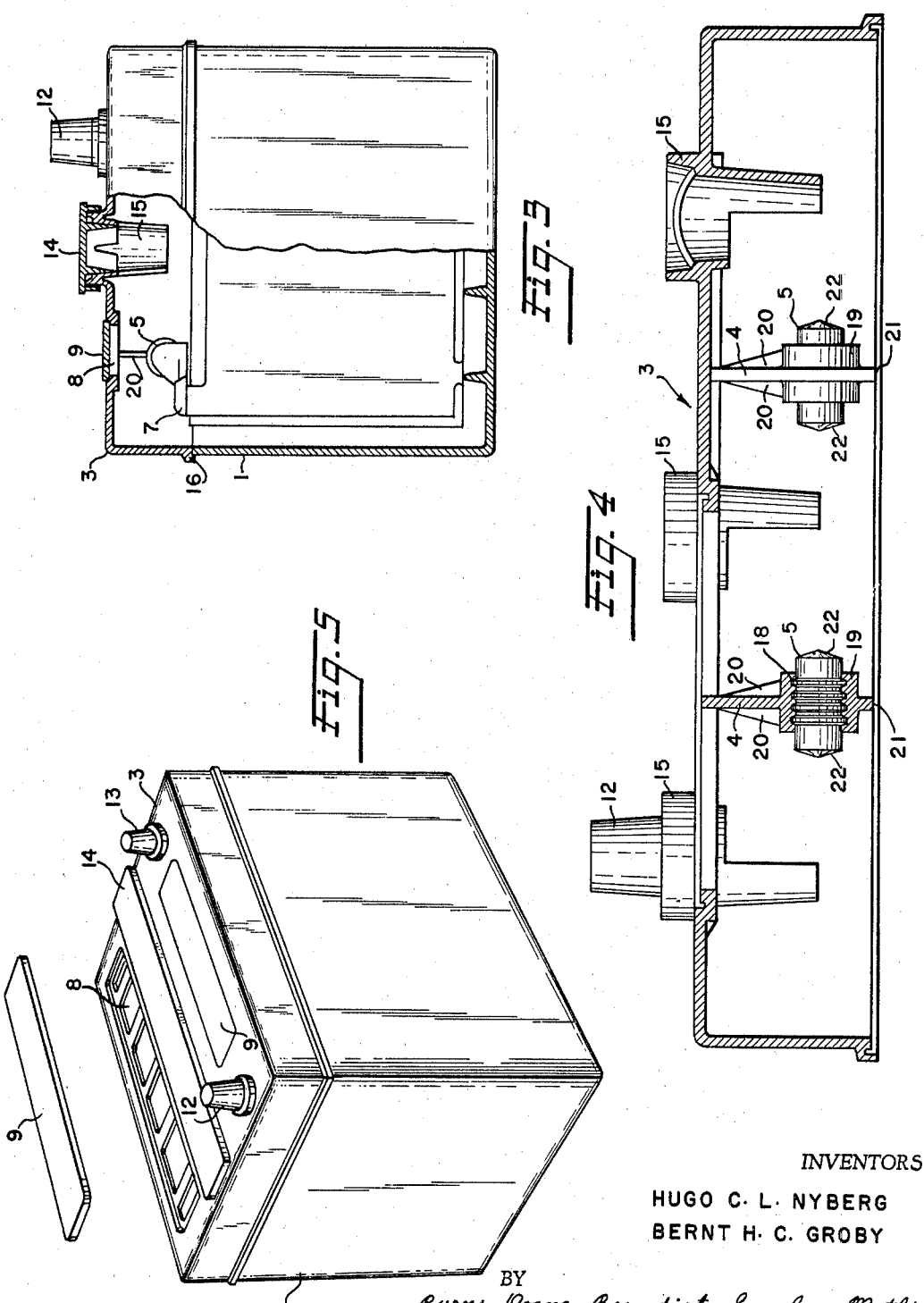

United States Patent Office 3,484,299
Patented Dec. 16, 1969

3,484,299
MULTICELL STORAGE BATTERY
Hugo C. L. Nyberg and Bernt H. C. Groby, Nol, Sweden, assignors to Aktiebolaget Tudor, Stockholm, Sweden, a corporation of Sweden
Filed Feb. 20, 1967, Ser. No. 617,139
Claims priority, application Sweden, May 10, 1966, 6,371/66
Int. Cl. H01m 35/12
U.S. Cl. 136—134                                5 Claims

ABSTRACT OF THE DISCLOSURE

This disclosure relates to a multicell lead-acid storage battery, such as is used for starting internal combustion engines, where the electrical connections between adjacent cells are located inside the battery and above the liquid electrolyte. A unitary cover is provided which seals all the cells in the battery, and the electrical connecting member is formed as an integral part of the cover. Special openings in the cover are provided for welding the bridges of electrode groups to the electrical connecting member after the cover is sealed in place.

BACKGROUND OF INVENTION

Field of invention

This invention relates to a multicell accumulator battery, particularly of the lead-acid type which is particularly characterized in that the electrical connections between adjacent cells are located inside the battery casing and under a unitary cover, and are in the form of lead-throughs extending through the partitions that separate the adjacent cells.

Description of prior art

From several points of view it is advantageous to lead the electrically conductive lead-through members which connect the sets of electrodes in adjoining cells with each other through the partition between the said cells. As is easily understood, a substantial saving in material is achieved compared with the arrangement of the said connectors outside the battery cover, as hitherto generally done. Another advantage consists in the battery having a smooth top, free from external electrically conductive metals, except for the terminal posts.

Several designs are known by which the above-mentioned advantages have been obtained in the manner indicated, whereby it has been found, however, that sooner or later leakages for the electrolyte in the cells occur at the sites where the above-mentioned electrically conductive lead-through members are attached.

The difficulties are due to the fact that the conductive connectors between adjoining cells must be attached after the electrodes and separators of the cell have been put in place. When storage batteries are being put together, negative and positive electrodes are assembled and soldered to their respective terminal straps prior to installation in the cell containers. The electrodes are held apart by electrically insulating, liquid electrolyte permeable separators. Electrodes of like polarity are soldered at certain connecting points to so-called terminal straps and form so-called elements. The elements fill the cells completely so the electrodes will stand firmly and not be damaged by vibrations and the like. But this implies that no lead-through devices may be placed in the partitions prior to the introduction of the elements into the cells.

By means of the invention, these and other difficulties existing in the manufacture of storage batteries of the kind discussed here are overcome in an effective and simple way in that the inter-cell connectors are placed in the portions of the partitions that are arranged in the container cover.

SUMMARY OF THE INVENTION

The battery according to the invention consists of several cells arranged parallel to each other in the same container and preferably fitted with a common cover, which cells are separated from each other by insulating liquid-tight partitions in which electric conductors are arranged as lead-throughs from one cell to the adjoining cell, characterized in that portions of the partitions, including the said lead-throughs, are arranged in the said cover.

BRIEF DESCRIPTION OF DRAWINGS

FIGURE 3 is an end view in partial section of the battery of FIGURES 1 and 2;

FIGURE 4 is a side elevation in partial section and to an enlarged scale of just the cover for the battery of FIGURES 1–3; and FIGURE 5 is a pictorial view of a second embodiment of a battery incorporating the present invention.

DESCRIPTION OF PREFERRED EMBODIMENTS

With continued reference to the drawings, the battery illustrated in FIGURES 1–4 has three cells in a unitary container 1 which has a bottom and side walls extending upwardly toward the top of the casing. Partitions 2 extend crosswise of the battery. In each cell, the positive electrodes and the negative electrodes are joined together at 6 by their respective electrode bridges 7; the plates are kept from contacting each other by separators 10; and the cell is filled with a liquid electrolyte.

In a storage battery, the cells are customarily connected electrically in series. The positive plates of one cell are connected to the negative plates of the adjacent cell so that the total voltage of the battery is the sum of the voltages of the cell. In such case, the electrolytes in each cell are at a different electrical potential, and the partitions 2 must therefore be liquid-tight.

Figure 1:
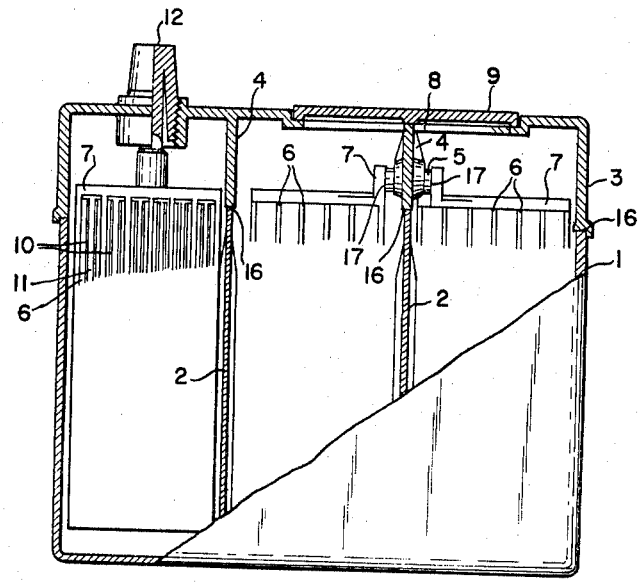
FIGURE 1 is a partial front elevation in partial section of a battery incorporating the present invention.
Figure 2:
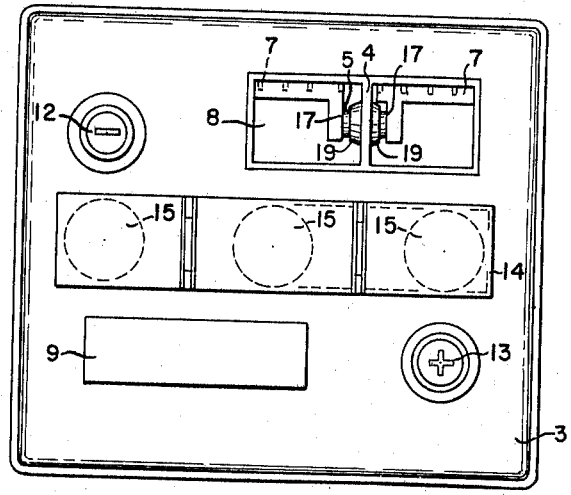
FIGURE 2 is a top plan view of the battery of FIGURE 1.

With reference to FIGURES 1, 2 and 3, the electrode bridges 7 are connected at 6 by welding to the tops of the electrodes 11. Each bridge terminates in a connecting portion that is either connected to one of the battery terminals 12, 13 or located adjacent to but above the top edge of a partition 2 so that an electrical connection can be made through an extension of the partition without allowing leakage of electrolyte from one cell to the other.

Referring now to FIGURE 4, cover 3 for the battery, which is shown to an enlarged scale, may include terminal post 12 and the filling openings 15 on the upper side of the cover and two partitions 4 on the lower side of the cover. Each cover partition 4 contains a lead-through 5 of electrical conducting material which serves as the connecting means between the bridge members 7 in the adjacent cells. The lead-through member 5 may be generally cylindrical in configuration and have external projections such as rings 18, which anchor lead-through 5 to boss 19. Boss 19 is an enlarged portion integral with partition 4, and lead-throughs 5 may be cast in place when the cover is formed. Suitable reinforcing webs 20 may be provided if desired. The lower surfaces 21 of partitions 4 are adapted to engage and mate with the upper surfaces of partition 2 in the casing, as shown at 16 in FIGURE 1.

For fabrication of the battery of the present invention, the electrode groups for each cell are assembled complete with their spacers 10 as a unit and inserted in casing 1 between the casing walls and partitions 2. The pole bridges 7, excepting for those connected to the battery terminals 12, 13, each have upwardly extending portions that are aligned with a corresponding portion of a pole bridge from an electrode group in the adjacent cell. In the case of the middle cell in the battery illustrated in FIGURES 1 through 4, the connection from the positive plate group is through the portion of the battery shown in FIGURE 2, which is visible through apertures 8 in cover 3; under plate cover 9, corresponding apertures are provided which, if cover plate 9 were removed, would show the connection between the negative electrode group of the center cell and the positive electrode group of the adjacent cell. The negative electrode group of the last-mentioned cell is connected to the negative terminal post 12 of the battery. Until cover 3 for the battery is placed in position, there is no interconnection between the electrode groups of the various cells.

Cover 3, which is separately shown in FIGURE 4, is provided as a subassembly and ready for placement on container 1 after the electrode groups have already been installed. When cover 3 is located in place, the lead-throughs 5 extend between the upwardly extending portions of bridges 7 of electrode groups in the adjacent cells. End surfaces 22 of lead-throughs 5 are tapered so as to fit tightly against the facing surfaces of bridges 7.

The joining of cover 3 to container casing 1 at 16, and also the joining of the partitions 4 in cover 3 to the upper surfaces of partitions 2 at 16, in container 1 may be done by so-called "mirror welding" or by any other convenient manner, such as by means of heating wires. By "mirror welding" the mating edge surfaces of container 1, including the upper surfaces of partitions 2 and the corresponding surfaces of cover 3, are placed in contact with heated plates which raise the temperature of the mating battery surfaces to a softening point whereby upon placing them in contact, a seal may be made.

The facing bridges 7 are connected to lead-throughs 5 after cover 3 has been put in place on the container. This joining may be accomplished by resistance welding by use of a welding tool inserted through openings 8 which are on opposite sides of partition 4 in cover 3, as shown in FIGURE 2. After the final electrical connection between lead-throughs 5 and electrode bridges 7 has been made, apertures 8 are closed by a cover plate 9.

In FIGURE 5, a battery having six cells and adapted to produce 12 volts is illustrated. The similar parts of this battery have been designated by the same reference numerals as used in the embodiment illustrated in FIGURES 1–4. Apertures 8 extend along both sides of the cover to provide access to the lead-throughs between adjacent cells and after the battery is assembled, are closed by cover plates 9.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A multicell storage battery having a plurality of cells in a unitary casing, each of said cells containing positive and negative electrode groups and a liquid electrolyte, and being separated by liquid-tight partitions of insulating material; a cover for said battery having a top portion and a plurality of normally extending partition portions in alignment with the partitions between adjacent cells, said aligned partitions being joined to form a liquid-tight partition extending to the underside of the battery cover; an electrode bridge member connected to plates forming each electrode group and extending to a position adjacent one of the cover partitions; and an electrically conducting connecting means mounted through that portion of the partition that is part of the cover which electrically connects a bridge member in one cell with a bridge member in the next adjacent cell.

2. The storage battery of claim 1 wherein the partitions in said cover have regions of enlarged thickness; and wherein the connecting means comprises an elongated member having a central portion, external protruding surface configurations embedded in said partitions at said regions where the partitions have an enlarged thickness, and end surfaces which engage the bridge members in the adjacent cells.

3. A multicell storage battery having a plurality of cells in a unitary casing, each of said cells containing positive and negative electrode groups and a liquid electrolyte, and being separated by liquid-tight partitions of insulating material; a cover for said battery having partitions in alignment with the partitions between adjacent cells, said aligned partitions being joined to form a liquid-tight partition extending to the underside of the battery cover; an electrode bridge member connected to plates forming each electrode group and extending to a position adjacent one of the cover partitions; and an electrically conducting connecting means mounted in that portion of the partition that is part of the cover which electrically connects a bridge member in one cell with a bridge member in the next adjacent cell; said cover contains tool receiving apertures on opposite sides of a partition at the location of each connecting means and each connecting means is rigidly secured to each joining bridge means, and plate means for closing said apertures.

4. The storage battery of claim 3 wherein the connecting means is welded to each joining bridge means.

5. A multicell storage battery having a plurality of cells in a unitary casing, each of said cells containing positive and negative electrode groups and a liquid electrolyte, and being separated by liquid-tight partitions of insulating material; a cover for said battery having partitions in alignment with the partitions between adjacent cells, said aligned partitions being joined to form a liquid-tight partition extending to the underside of the battery cover; an electrode bridge member connected to plates forming each electrode group and extending to a portion adjacent one of the cover partitions; and an electrically conducting connecting means mounted in that portion of the partition that is part of the cover which electrically connects a bridge member in one cell with a bridge member in the next adjacent cell; said cover having regions of enlarged thickness; said connecting means comprises an elongated member having a central portion, external protruding surface configurations embedded in said partitions at said regions where the partitions have an enlarged thickness, and end surfaces which engage the bridge members in the adjacent cells; said end surfaces are shaped to abut both bridge members to be connected together as the cover is placed in position and be compressed therebetween; said cover contains apertures on opposite sides of the partition at the location of each connecting means to permit welding of the connecting means to the bridge members, and plate means for closing said apertures.

References Cited

UNITED STATES PATENTS

| 1,425,924 | 8/1922 | Willard | 136—134 |
| 1,882,414 | 10/1932 | Ford | 136—134 |
| 1,942,350 | 1/1934 | Appel et al. | 136—134 |
| 3,386,860 | 6/1968 | Maier | 136—134 XR |

FOREIGN PATENTS

| 510,238 | 7/1939 | Great Britain. |
| 564,060 | 1/1957 | Italy. |

WINSTON A. DOUGLAS, Primary Examiner

D. L. WALTON, Assistant Examiner

U.S. Cl. X.R.

136—170